(12) United States Patent
Likar et al.

(10) Patent No.: US 8,213,942 B2
(45) Date of Patent: Jul. 3, 2012

(54) METHOD FOR COGNITIVE 4G NEIGHBORHOOD SELECTION

(76) Inventors: Bojan Likar, Ig (SI); Robert Posel, Ljubljana (SI); Andreas Kalagasidis, Ljubljana (SI); Janez Bester, Zg.Besnica (SI); Andrej Kos, Blejska Dobrava (SI); Mojca Volk, Bled (SI); Urban Sedlar, Bohinjska Bistrica (SI); Luka Mali, Novo mesto (SI); Janez Sterle, Ljubljana (SI)

( * ) Notice: Subject to any disclaimer, the term of this patent is extended or adjusted under 35 U.S.C. 154(b) by 0 days.

(21) Appl. No.: 12/896,265

(22) Filed: Oct. 1, 2010

(65) Prior Publication Data

US 2012/0083279 A1    Apr. 5, 2012

(51) Int. Cl.
*H04W 40/00* (2009.01)
(52) U.S. Cl. .............. 455/446; 455/67.11; 455/67.13; 455/226.1; 455/226.2; 455/226.3
(58) Field of Classification Search .......... 455/436, 455/437, 438, 440, 442, 443, 67.11, 67.13, 455/226.1, 226.2, 226.3, 446
See application file for complete search history.

(56) References Cited

U.S. PATENT DOCUMENTS

| | | | |
|---|---|---|---|
| 7,379,739 B2 | 5/2008 | Rajkotia | |
| 2008/0240043 A1 | 10/2008 | Lee | |
| 2009/0005052 A1 | 1/2009 | Abusch-Magder | |
| 2009/0036116 A1* | 2/2009 | Kim et al. ............. | 455/423 |
| 2009/0275335 A1 | 11/2009 | Jalloul | |
| 2009/0280812 A1* | 11/2009 | Cheng et al. ............ | 455/436 |

FOREIGN PATENT DOCUMENTS

GB    2370449    6/2002

* cited by examiner

*Primary Examiner* — Temica M Beamer
(74) *Attorney, Agent, or Firm* — David H. Jaffer; Pillsbury Winthrop Shaw Pittman LLP

(57) ABSTRACT

A method for cognitive neighbor selection in 4G networks describes a mechanism for automatic self-learning selection of neighboring base stations for the purpose of providing seamless handoffs in a dense deployment of pico and macro base stations. When a 4G network is modified by adding new base stations, the optimum handoff thresholds and advertised base station neighbors are automatically recalculated in a manner that reduces the number of unnecessary handoffs in a dense network with large number of pico and macro base stations.

3 Claims, 5 Drawing Sheets

METHOD FOR COGNITIVE 4G NEIGHBORHOOD SELECTION

BACKGROUND OF THE INVENTION

In a wireless network, the quality of the service (QoS) is an important factor of user satisfaction. In order to assure high QoS the network must provide sufficiently high throughput per user. This can be in part achieved by ensuring the limited resource of wireless spectrum is efficiently utilized. Techniques such as TMDA, FDMA, CDMA, OFDMA, CSMA allow effectively simultaneous communication of a multitude of mobile stations (MS) with the base station.

However, to further increase the throughput per user once the spectrum is efficiently utilized, the network must be divided into geographically separate segments or cells, each being served by its own base station. A single cell serves local MS only; by having smaller cells, less MSs per cell share the same bandwidth. Thus, each MS is granted a higher share of the available bandwidth.

To maximize net throughput per user in 4G networks, an operator utilizes a large number of cells much smaller than cells in traditional cellular networks. Such cells are termed pico cells, each served by a pico base station.

In a network, covered by a high number of densely distributed base stations with partially or completely overlapping cells, it is crucial to automate the network operation and management. An important aspect of network management is congestion avoidance, which assures that no single base station is overloaded if there is available transmission capacity available that could be used to offload the congested base station. However, such high density of 4G networks at the same time increases the amount of handoff (handover) events, where mobile station switches from one base station to the next.

Handoffs typically occur when a mobile station moves between two cells, when environmental conditions affecting radio wave propagation change or when base station becomes congested. In the best case, successful handoffs introduce communication overhead. However, in the worst case unsuccessful handoffs can degrade communication performance and can cause the connection to drop. Ensuring handoff success thereby represents an important part of assuring acceptable QoS.

A multitude of methods concerning handoff optimization exist. A method described in U.S. Pat. No. 7,379,739 relies on a handoff controller which monitors MS location and velocity and uses that information as a basis for optimum base station estimation. Furthermore, GB 2370449 A similarly discloses a method incorporating a kinetic unit for determining kinetic characteristics (speed, location) of the MS and BS signal strength to determine optimal target cells for handoff. US patent application No. 2008/0240043 A1 discloses a method for performing handoff considering QoS in a broadband mobile system; the method is based on a MS performing the signal strength measurements and making a handoff request when better conditions are available at a different BS. Similar approaches, based on RSSI measurements on the MS are described in patent applications US 2009/0005052 A1 and US 2009/0275335 A1.

The fact that in a 4G network each base station advertises its local neighbors to the mobile stations enables flexible high-level handoff management that was not possible in traditional cellular networks.

The present invention aims to orchestrate handoff events of the 4G network, thus reducing the number of necessary handoffs of a MS. The 4G Self-Organizing Network (SON) server performs a neighbor selection procedure which determines a limited set of optimal handoff candidates and excludes the neighbors with low handoff success probabilities. The SON server can additionally apply machine learning algorithms to the historic handoff data to further optimize the vicinity area which serves as a starting point for completely automated optimum neighbor selection.

DETAILED DESCRIPTION OF THE INVENTION

After a new base station ($BS_{new}$) is added to a wireless 4G network, its geographic footprint covers a certain serving area $A_{BSnew}$ (208) with a border $L_{BSnew}$ (207) that is highly dependant on the environmental factors that influence the radio wave propagation. The area $A_{BSnew}$ and its border $L_{BSnew}$ are located within a predefined vicinity area (206) of the new base station and are determined by taking into account measurements performed by mobile stations as is known from prior art. In the initial phase, neighboring base stations are determined based on geographical proximity and RSSI measurements performed by mobile stations as is known from prior art. During operation, all handoff events and information thereof are stored for later analysis.

SON server additionally obtains information about RSSI distributions, CINR distributions and serving areas of all base stations. Obtained information is used to generate a list of serving areas that overlap the $BS_{new}$ base station serving area.

Then, an iterative procedure takes place, which performs the following steps.

For each base station (403) with serving area overlapping the $BS_{new}$ base station (404) serving area (406), two metrics are calculated.

Figure 1:
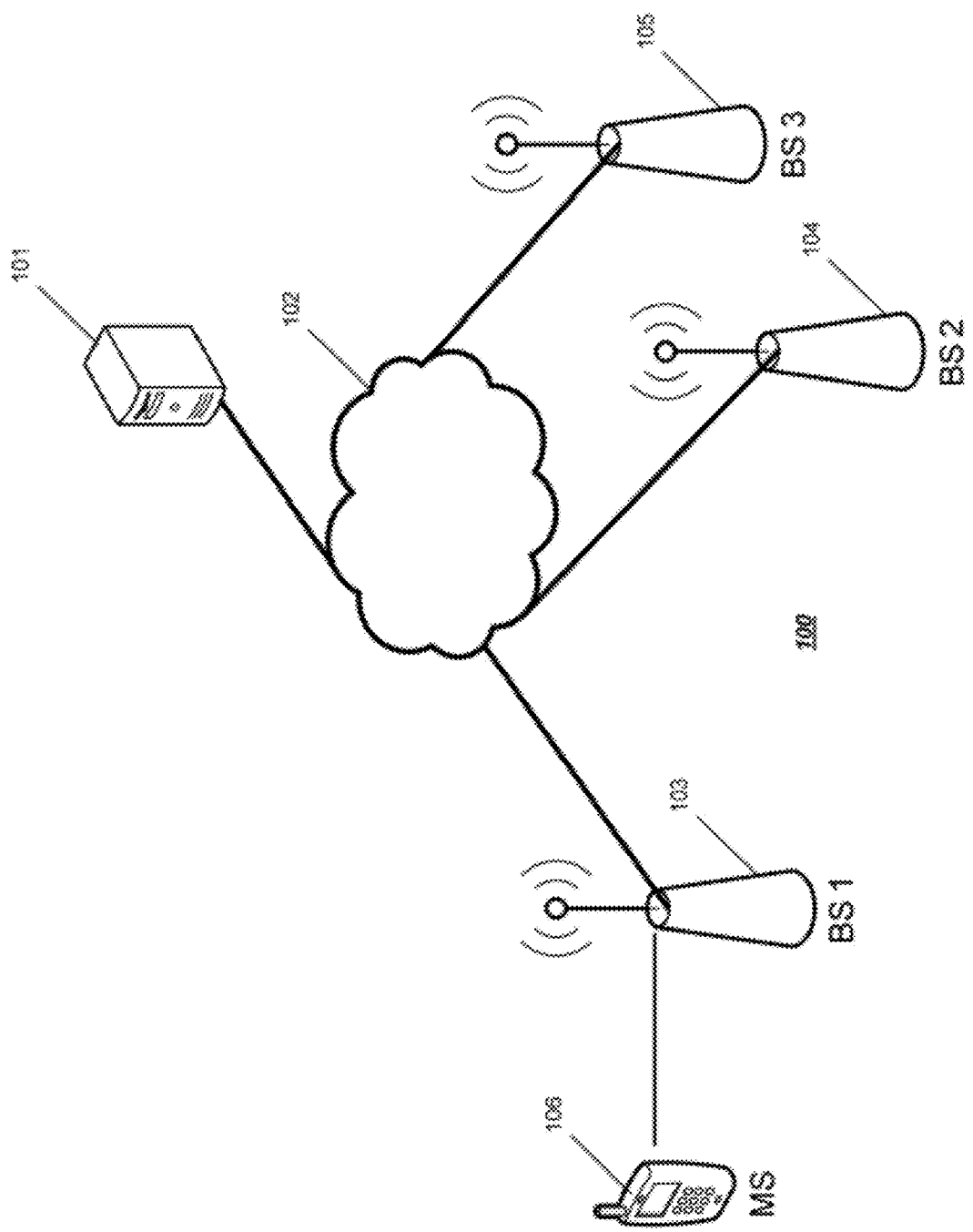
FIG. 1 shows a generalized 4G mobile network consisting of a plurality of base stations (BS) (103,104,105), a network interconnecting the base stations (102), one of a plurality of mobile stations (MS) (106) connected to a base station and a Self-organizing Network (SON) server (101).
Figure 2:
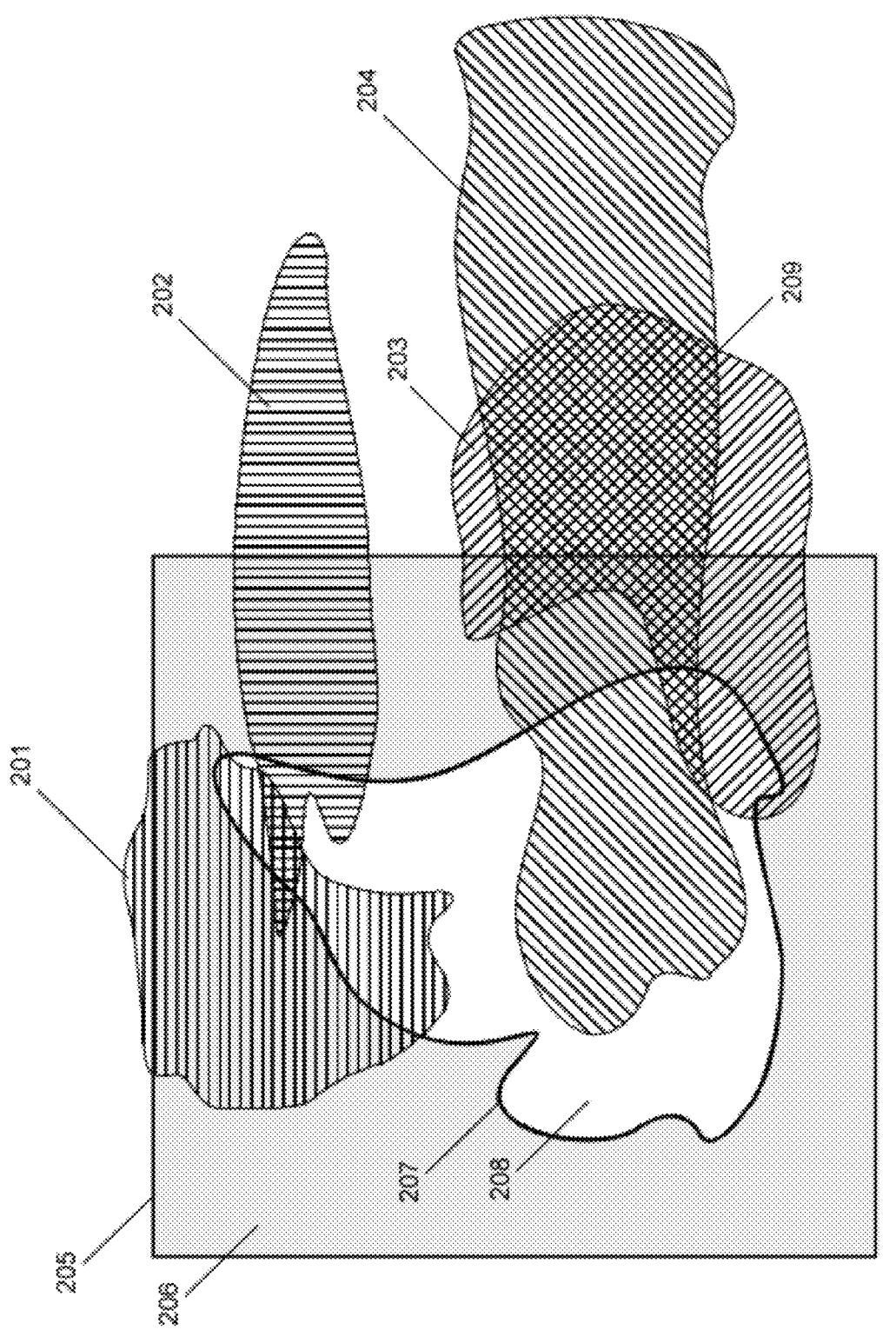
FIG. 2 shows a coverage map of four existing base stations (201, 202, 203, 204) together with the coverage area of a newly added base station (208) with indicated rectangular vicinity area (206).
Figure 3:
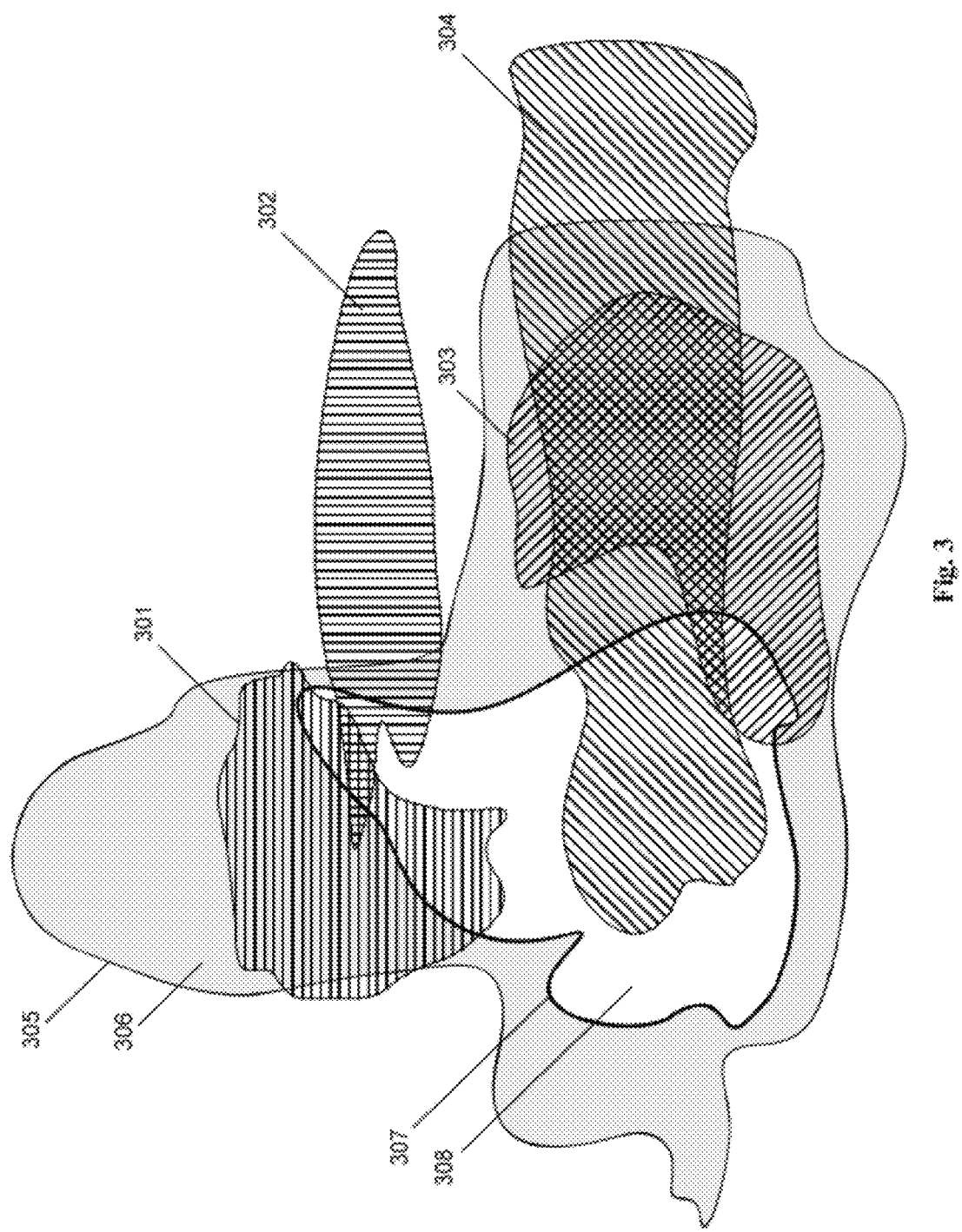
FIG. 3 shows a coverage map of four existing base stations (301, 302, 303, 304) together with the coverage area of a newly added base station (308) with indicated weighed vicinity area (306).
Figure 4:
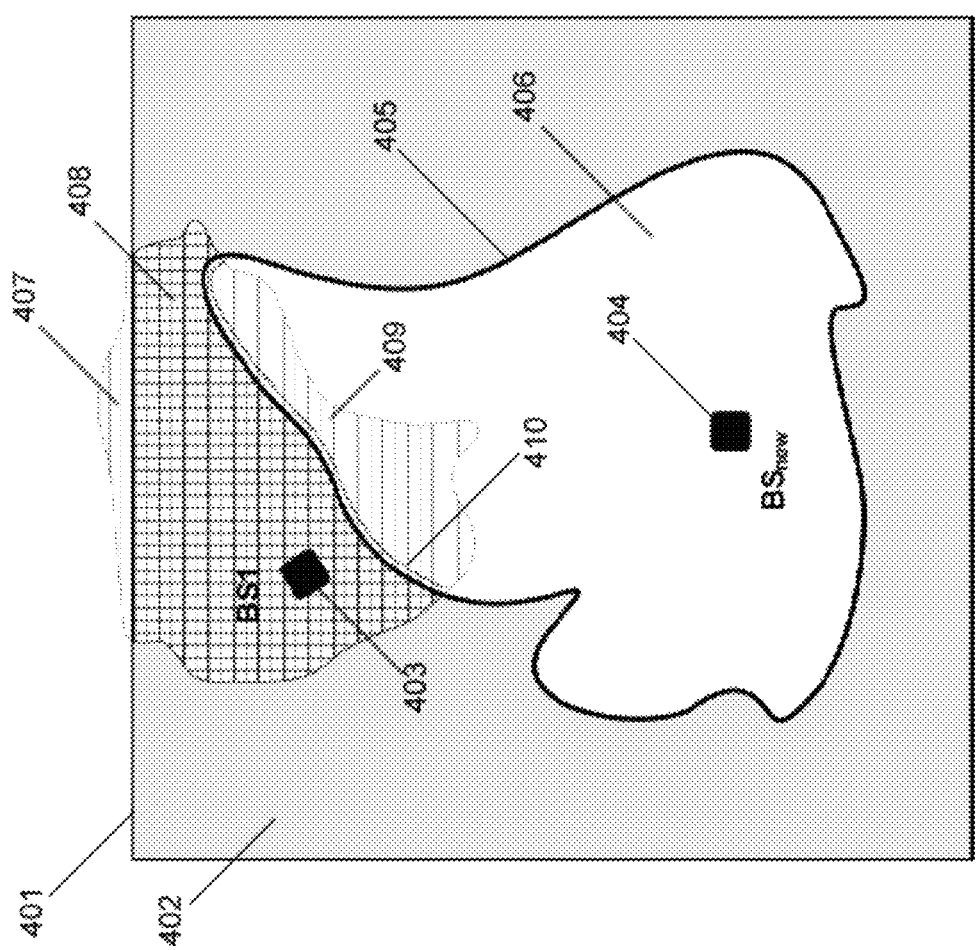
FIG. 4 shows the overlap of two base stations (403, 404) and the concepts required for calculation of metrics, used to determine the suitability of the neighboring base station (403) in the sparse neighbor list.
Figure 5:
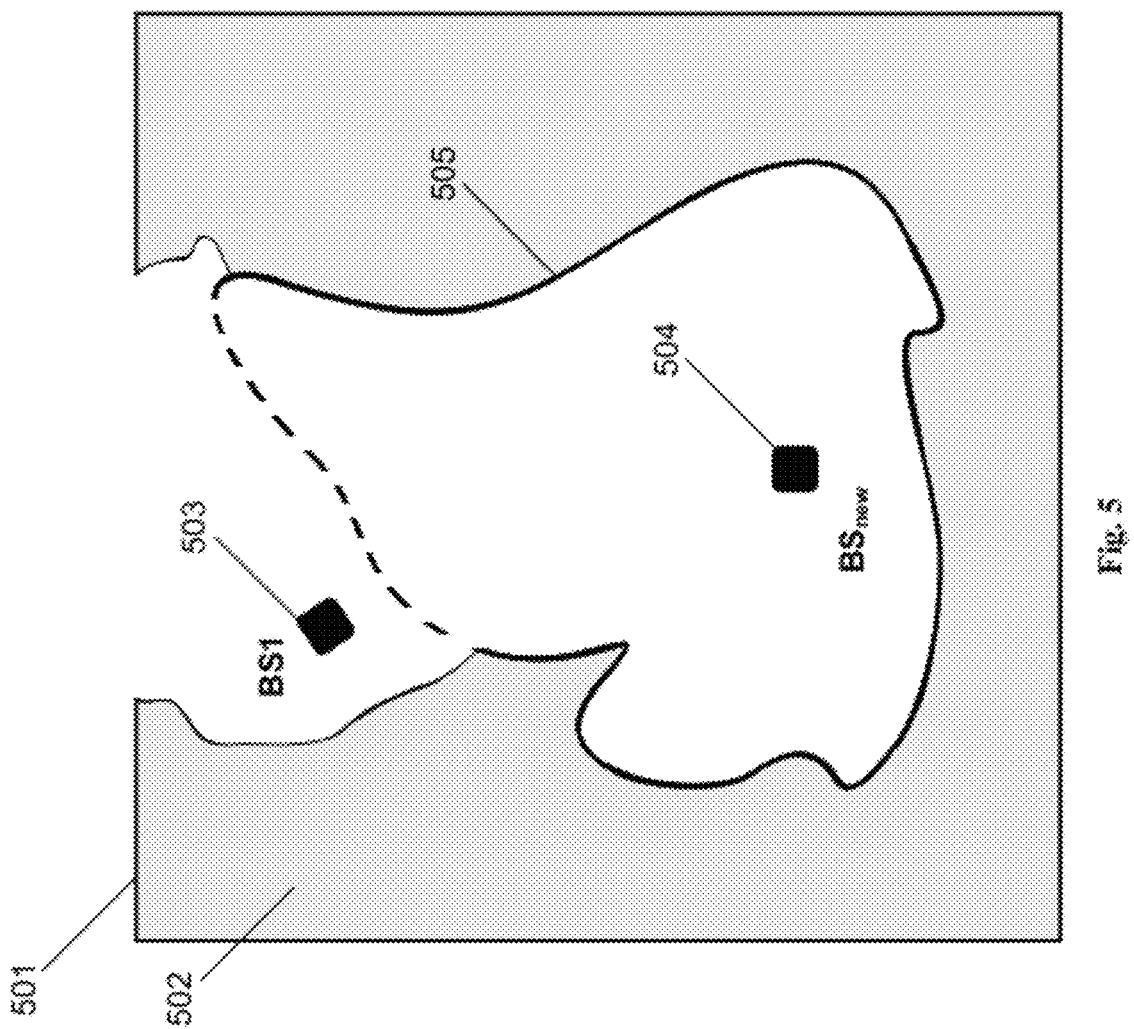
FIG. 5 shows the vicinity (502) and the new border curve (505) of the newly added base station $BS_{new}$ (504) after the first iteration of the process, where the area covered by the $BS_1$ (503) had already been removed.

First metric represents a percentage of the serving area of neighboring base station $BS_i$ (403) which resides within the vicinity area (402) of $BS_{new}$ (404) but does not overlap (408) the serving area of the $BS_{new}$. This is demonstrated in FIG. 4, where two base stations, $BS_{new}$ (404) and neighboring $BS_1$ (403) are shown. Overlap of serving areas (409) of $BS_1$ and $BS_{new}$ is subtracted from overall serving area of the $BS_1$. Additionally, the part of the serving area of $BS_1$ outside (407) of the vicinity area (402) is also subtracted from the overall serving area of the $BS_1$.

The calculated area (408) is then divided by the overall serving area of $BS_1$ to obtain a percentage of served area within the vicinity area (402) of $BS_{new}$, as shown in formula 1.

$$PSA(BS_i) = \frac{ServingArea(BS_i) - ServingAreaOverlap(BS_i BS_{new}) - AreaOutsideVicinity(BS_i)}{VicinityArea(BS_{new})} \quad \text{Formula 1}$$

The second metric represents the percentage of the entire border curve (410) of the $BS_{new}$ base station (404) serving area (406) that is covered by the neighboring (403) station's serving area (408). The percentage is obtained by dividing the length of the border curve of $BS_{new}$ serving area under the overlap with $BS_1$ serving area, divided by the entire $BS_{new}$ serving area border length, as is shown in formula 2.

$$PBC(BS_i) = \frac{BorderOverlap(BS_i, BS_{new})}{BorderLength(BS_{new})} \quad \text{Formula 2}$$

Next, both percentages are added together. A neighboring base station with the highest $Sum_i$ is selected and added to the neighbor list, see formula 3.

$$Sum_i = PSA(BS_i) + PBC(BS_i) \quad \text{Formula 3}$$

When the neighbor list is updated with a new neighboring base station, the vicinity area (502) and the new border curve (505) is recalculated by removing the contributions of all neighboring base stations within the vicinity area while disregarding all areas of overlap (408) with the $BS_{new}$.

The described process is repeated until $Sum_i$ drops below a preconfigured threshold $Sum_{max}$. When the process is completed, the base station neighbor list includes neighboring base stations, for which the handoff success rate on average significantly exceeds the success rate of a randomly chosen sample of neighbors.

The invention claimed is:

1. A method for cognitive neighbor selection in 4 g networks including a plurality of base stations comprising the steps of:

a) obtaining, by a SON server, information about RSSI distributions, CINR distributions and serving areas of base stations;

b) calculating a first metric and a second metric for each existing base station (403) with serving area overlapping a new $BS_{new}$ base station (404) serving area (406), wherein the first metric represents the portion of the existing base station's serving area that does not overlap with the serving area of the new base station and the second metric represents the portion of the border of the serving area of the new base station that lies within the serving area of the existing base station;

c) adding said metrics together, and selecting a neighboring base station with the highest $Sum_i$ and adding said new base station to a neighbor list;

d) after updating the neighbor list with the new base station, calculating a vicinity area (502) and a new border curve (505) by removing the contributions of all neighboring base stations within the vicinity area while disregarding all areas of overlap (408) with the $BS_{new}$;

e) repeating said process until $Sum_i$ drops below a preconfigured threshold $Sum_{max}$.

2. A method according to claim 1, wherein said first metric is calculated according to the following formula $$PSA(BS_i) = \frac{ServingArea(BS_i) - ServingAreaOverlap(BS_i BS_{new}) - AreaOutsideVicinity(BS_i)}{VicinityArea(BS_{new})}.$$

3. A method according to claim 1, wherein said second metric is calculated according to the following formula $$PBC(BS_i) = \frac{BorderOverlap(BS_i, BS_{new})}{BorderLength(BS_{new})}.$$

* * * * *